(12) United States Patent
Lin et al.

(10) Patent No.: US 10,047,242 B2
(45) Date of Patent: Aug. 14, 2018

(54) BONDABLE BLOOD-FRIENDLY POLYMER AND PREPARING METHOD THEREOF

(71) Applicant: G Y BIO-MATERIALS CO., LTD., Nanjing (CN)

(72) Inventors: Sicong Lin, Nanjing (CN); Hui Lin, Nanjing (CN); Wei Wu, Nanjing (CN)

(73) Assignee: GY BIO-MATERIALS CO., LTD., Nanjing (CN)

( * ) Notice: Subject to any disclaimer, the term of this patent is extended or adjusted under 35 U.S.C. 154(b) by 157 days.

(21) Appl. No.: 14/784,972

(22) PCT Filed: Apr. 23, 2014

(86) PCT No.: PCT/CN2014/076044
§ 371 (c)(1),
(2) Date: Oct. 16, 2015

(87) PCT Pub. No.: WO2014/173299
PCT Pub. Date: Oct. 30, 2014

(65) Prior Publication Data
US 2016/0083610 A1    Mar. 24, 2016

(30) Foreign Application Priority Data

Apr. 27, 2013 (CN) .......................... 2013 1 0153549

(51) Int. Cl.
| | | |
|---|---|---|
| *C09D 133/14* | (2006.01) | |
| *C08F 220/28* | (2006.01) | |
| *C08F 226/02* | (2006.01) | |
| *C08F 290/06* | (2006.01) | |
| *C09J 133/14* | (2006.01) | |
| *C09D 143/02* | (2006.01) | |

(52) U.S. Cl.
CPC .......... *C09D 133/14* (2013.01); *C08F 220/28* (2013.01); *C08F 226/02* (2013.01); *C08F 290/062* (2013.01); *C09D 143/02* (2013.01); *C09J 133/14* (2013.01)

(58) Field of Classification Search
CPC .... C09D 133/14; C08F 220/28; C08F 226/02; C08F 290/062; C09J 133/14
See application file for complete search history.

(56) References Cited

U.S. PATENT DOCUMENTS

| | | | | |
|---|---|---|---|---|
| 6,733,123 B2 * | 5/2004 | Polzhofer | ............. | C08F 220/28 351/159.33 |
| 6,867,257 B2 * | 3/2005 | Lewis | ................... | C08F 246/00 524/800 |
| 7,713,541 B1 * | 5/2010 | Pacetti | .................... | A61L 27/34 424/423 |
| 2008/0286332 A1 * | 11/2008 | Pacetti | .................... | A61L 27/34 424/424 |

FOREIGN PATENT DOCUMENTS

CN        102690388 A  *  9/2012

OTHER PUBLICATIONS

Heath, Daniel E., and Stuart L. Cooper. "Design and characterization of sulfobetaine-containing terpolymer biomaterials." Acta biomaterialia 8.8 (2012): 2899-2910.*
Machine Translation of CN102690388, performed at Espacenet, Sep. 1, 2017.*
Kim, Yoseop, Sandra Binauld, and Martina H. Stenzel. "Zwitterionic guanidine-based oligomers mimicking cell-penetrating peptides as a nontoxic alternative to cationic polymers to enhance the cellular uptake of micelles." Biomacromolecules 13.10 (2012): 3418-3426. (Year: 2012).*

* cited by examiner

*Primary Examiner* — Nicholas E Hill
(74) *Attorney, Agent, or Firm* — Anna Tsang

(57) ABSTRACT

A bondable blood-friendly polymer is a terpolymer or a quadripolymer at least formed by polyethylene glycol alkyl ether acrylate or polyethylene glycol alkyl ether methacrylate (I), and zwitterionic acrylic ester or zwitterionic methacrylic ester (II), and acrylic acid or a methacrylate derivative with an epoxypropyl group, an isocyanate group, a trialkoxy silane, a hydroxyalkyl group, a propargyl group or a quaternary ammonium group (III). In the present invention, the blood-friendly polymer with a potentially-bondable group has the following advantages: although the water insolubility thereof is implemented by using the hydrophobicity physical effect of an existing higher alkyl acrylate linkage, the blood friendliness of a coating is reduced due to the existence of a great number of hydrophobic chain links in the polymer; and a physical coating is slowly desolventized from the surface to be ablated in the application process of the physical coating. A disclosed bondable blood-friendly polymer coating not only can overcome these defects, but also can improve the blending property thereof. Disclosed are composition, a structure and a preparation method of the bondable blood-friendly polymer.

17 Claims, No Drawings

BONDABLE BLOOD-FRIENDLY POLYMER AND PREPARING METHOD THEREOF

BACKGROUND

Field of Invention

The present invention relates to a novel class of blood-friendly polymers with bondable function.

Description of Related Art

Blood-friendly material and its products have been considered to have significant effect on science, economics and our society, however, because of the extremely complicated function and effect of the material to the blood, the progress is limited, even though so much focus is given to the R&D of biomedical material since the thirties last century. A lot of monographs and patents on the subject have been disclosed: Lin Sicong, Polymer Bulletin, 1997 (1), 1-10; 1997 (2), 76-81; 1998 (1), 1-10; Lin Sicong, Huang Nan, a report named of "Research on key science and technology of anticoagulant materials" in "National Key Basic Research Program of China" 973 program, 2004; Lin Sicong, The world's major academic thought (outcome) awards collection, World Literature Publishing House, 2011, 248-256; Bowers et al.; and some US Patent, such as U.S. Pat. Nos. 5,648,442, 5,705,583, 5,739,236, 6,225,431, 6,090,901, 5,741,923, 5,712,326, 6,150,432, 6,743,878, 6,420,453, 5,741,923, 5,048,442, and 7,160,953.

A new soluble and blendable blood-friendly zwitterionic polymer and its preparation method have been described in the previous patent application (CN 201210177997.9).

SUMMARY

The main object of the present invention is to develop a novel class of blood-friendly polymers with bondable function, which is soluble and blendable, and it also can be bonded firmly by self-cross linkage or the bonding with matrix after construction, thus can be used better for coating on a variety of devices or materials.

Technical schemes of the present invention are as follows:

A blood-friendly polymer with bondable function which is a terpolymer or quadripolymer synthesized by the copolymerization of polyethylene glycol alkyl ether acrylate or polyethylene glycol alkyl ether methacrylate (I), and zwitterionic acrylic ester or zwitterionic methacrylic ester (II), and acrylic acid or methacrylate derivative with a trimethoxysilyl, an epoxypropyl, an isocyanate, a hydroxyalkyl, a propargyl, or a quaternary ammonium group (III).

The blood-friendly polymer with bondable function mentioned above, wherein the mole ratio of polyethylene glycol alkyl ether acrylate or polyethylene glycol alkyl ether methacrylate (I), zwitterionic acrylic ester or zwitterionic methacrylic ester (II), and acrylic acid or methacrylate derivative with a trimethoxysilyl, an epoxypropyl, an isocyanate, a hydroxyalkyl, a propargyl, or a quaternary ammonium group (III) is 1-9:1-7:0.2-3.

The blood-friendly polymer with bondable function mentioned above, wherein the structural formula of polyethylene glycol alkyl ether acrylate or polyethylene glycol alkyl ether methacrylate (I) is as follows:

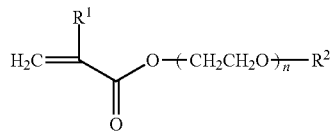

Wherein: $R^1$=H, or $CH_3$; $R^2$=$CH_3$, or $C_2H_5$; n=1-114.

The blood-friendly polymer with bondable function mentioned above, wherein zwitterionic acrylic ester or zwitterionic methacrylic ester (II) is selected from

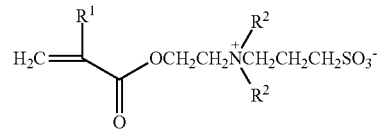

Wherein: $R^1$=H, or $CH_3$; $R^2$=$CH_3$, or $C_2H_5$;

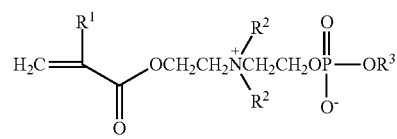

wherein: $R^1$=H, or $CH_3$; $R^2$=$CH_3$, or $C_2H_5$; $R^3$=$C_6$~$C_{12}$;

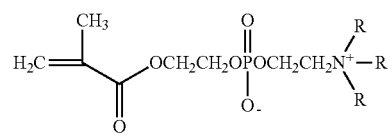

Wherein: R=$CH_3$, or $C_2H_5$; and

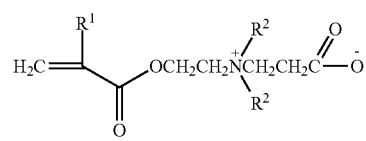

Wherein: $R^1$=H, or $CH_3$; $R^2$=$CH_3$, or $C_2H_5$.

The blood-friendly polymer with bondable function mentioned above, wherein acrylic acid or methacrylate derivative with a trimethoxysilyl, an epoxypropyl, an isocyanate, a hydroxyalkyl, a propargyl, or a quaternary ammonium group (III) is selected from

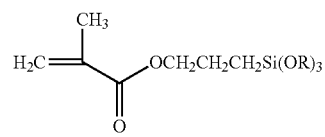

Wherein: R=$CH_3$, or $C_2H_5$;

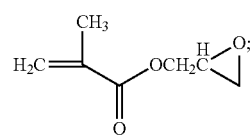

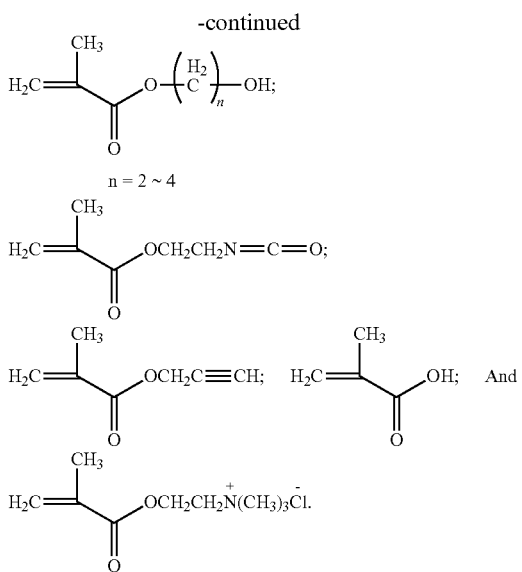

The blood-friendly polymer with bondable function mentioned above, wherein a higher alkyl methacrylate or a 3-[tris(trimethylsiloxy)silyl]propyl methacrylate could be added into polyethylene glycol alkyl ether acrylate or polyethylene glycol alkyl ether methacrylate (I), and zwitterionic acrylic ester or zwitterionic methacrylic ester (II), and acrylic acid or methacrylate derivative with a trimethoxysilyl, an epoxypropyl, an isocyanate, a hydroxyalkyl, a propargyl, or a quaternary ammonium group (III).

The bondable blood-friendly quadripolymer mentioned above, wherein the mole ratio of the polyethylene glycol alkyl ether acrylate or polyethylene glycol alkyl ether methacrylate (I), zwitterionic acrylic ester or zwitterionic methacrylic ester (II), acrylic acid or methacrylate derivative with a trimethoxysilyl, an epoxypropyl, an isocyanate, a hydroxyalkyl, a propargyl, or a quaternary ammonium group (III), and a higher alkyl methacrylate or a 3-[tris(trimethylsiloxy) silyl]propyl methacrylate is 1-8:1-7:0.2-3:2-4.

A preparation method of blood-friendly polymer with bondable function mentioned above, the method comprising; dissolving polyethylene glycol alkyl ether acrylate or polyethylene glycol alkyl ether methacrylate (I), and zwitterionic acrylic ester or zwitterionic methacrylic ester (II), and acrylic acid or methacrylate derivative with a trimethoxysilyl, an epoxypropyl, an isocyanate, a hydroxyalkyl, a propargyl, or a quaternary ammonium group (III) into alcohol or alcohol-tetrahydrofuran or dimethyl sulfoxide solvent containing radical initiator; polymerizing 24-45 h at 60-70° C. under a nitrogen atmosphere, and precipitating with anhydrous ether, Consequently, the bondable blood-friendly terpolymer can be obtained.

A preparation method of blood-friendly polymer with bondable function mentioned above, wherein the method comprising; dissolving polyethylene glycol alkyl ether acrylate or polyethylene glycol alkyl ether methacrylate (I), and zwitterionic acrylic ester or zwitterionic methacrylic ester (II), and acrylic acid or methacrylate derivative with a trimethoxysilyl, an epoxypropyl, an isocyanate, a hydroxyalkyl, a propargyl, or a quaternary ammonium group (III) and a higher alkyl methacrylate or a 3-[tris (trimethylsiloxy) silyl]propyl methacrylate into alcohol or alcohol-tetrahydrofuran or dimethyl sulfoxide solvent containing radical initiator, polymerizing 24-45 h at 60-70° C. under a nitrogen atmosphere, precipitating with anhydrous ether, Consequently, the bondable blood-friendly quadripolymer could be obtained.

The preparing method mentioned above, wherein the radical initiator is selected from azobisisobutyronitrile (AIBN), azobis cyano valeric acid (ACVA) and benzoyl peroxide (BPO).

The bondable blood-friendly polymer mentioned above not only has the potential of self-cross linkage or bonding with related interface and matrixes, but also can be blended well with epoxy resin, polyether urethane or room-temperature-vulcanized silicone rubber, thus it can be used for coating on a variety of devices or materials.

Beneficial Effects

Compared with conventional blood-friendly polymers, the blood-friendly polymer with a potentially-bondable group in the present invention provides great advantages as follows:

(1) As a blood-friendly coating on biomaterial surface, acrylic acid higher alkyl ester chain unit was used to improve its water-insoluble and blending property in some patents, but there are two deficiencies at least. First, due to the presence of a large number of hydrophobic chain units in the copolymer, the blood-friendliness of the coating is reduced; Second, physical coating will be dissolved off from the surface slowly in its application process. The bondable blood-friendly polymer coating disclosed in present invention can overcome these shortcomings.

(2) According to the application purpose, because of the various groups which have potential to be bonded in the polymer, the polymer not only can crosslink itself, but also can be bonded with matrixes of synthetic polymer or natural polymer. Thus the polymer could be applied in a wide range of applications with good practicality.

(3) The polymer can also bond with some materials' surface (e.g. glass, ceramics, metal etc.), due to the groups with the potential to be bonded in the polymer, which can achieve the purpose of enhancing the blood-friendliness, bio-friendliness and anti-biological contamination of the material surface.

(4) Owing to the blood-friendliness, blendable ability and potential bonding ability of the polymer, it can be blended with polyurethane, silicone rubber etc. Consequently, the blended polymer with blood-friendliness and good mechanical property can be used on a variety of medical devices.

(5) By bonding with related biological macromolecules, they can also be applied to the conservation of biological activity of the biological macromolecules.

Because of the advantages mentioned above, the bondable blood-friendly polymer will be widely used on medical devices (such as interventional catheters, kidney dialysis, urinary catheters, central venous catheters, contact lenses, etc.), drug controlled release, cell culture, bio-pharmaceutical, biological engineering, anti-bacterial contamination, anti-contamination and anti-marine microbial contamination etc.

DETAILED DESCRIPTION

The present invention will be further described by the following embodiments.

Example 1

Synthesis of poly[polyethyleneglycolmethylether methacrylate —CO -2-(N-3-sulfopropyl-N,N-dimethylammonium)ethyl methacrylate —CO-3-(trimethoxysilyl) propyl methacrylate] (8:1:1)

A mixed solution was prepared by adding 3.60 g (12.0 mmol) polyethyleneglycolmethylether methacrylate (MW=300), 0.42 g (1.5 mmol) 2-(N-3-sulfopropyl-N,N-dimethylammonium)ethyl methacrylate, 0.37 g (1.5 mmol) 3-trimethoxysilyl propyl methacrylate, 42.0 mg (0.26 mmol) AIBN and 30 mL ethanol into a 50 mL polymerization bottle. The mixed solution was stirred and cooled to −20° C., alternately vacuumed and filled with pure nitrogen five times, and then polymerized at 60° C. for 24 h under pure nitrogen atmosphere. The product was separated by precipitating the solution with anhydrous diethyl ether. The precipitate was filtered and washed with the solvent mixture of diethyl ether and ethanol (10:1) for 3 times and dried to constant weight by vacuum at room temperature, consequently, 2.7 g copolymer was obtained, the yield was 62% and the relative viscosity was 1.30 (25° C., ethanol, 0.01 g/mL).

FTIR
C=O 1721 $cm^{-1}$, $SO_3^-$ 1042 $cm^{-1}$, $N^+(CH_3)_2$ 960 $cm^{-1}$
C—O 1112 $cm^{-1}$, Si—O 1085 $cm^{-1}$

Elemental Analysis

Sulfur content: the theoretical value is 1.10%; the measured value was 1.2%;

Nitrogen content: the theoretical value is 0.48%; the measured value was 0.5%;

Silicon content: the theoretical value is 0.95%; the measured value was 0.8%.

Example 2

Synthesis of poly [polyethyleneglycolmethylether methacrylate —CO— 2-(N-2-hexyloxyphosphorylethyl —N, N— dimethylammonium)ethyl methacrylate —CO—N,N— methyl- N-2- methacryloyloxyethyl —N-2- hexyloxy phosphoryl oxygen ethyl ammonium —CO-γ-epoxypropyl methacrylate)] (9:3:3)

The preparation steps and polymerization conditions were the same with example 1.

3.9 g copolymer (yield 67%) was obtained with 4.28 g (9.0 mmol) polyethyleneglycolmethylether methacrylate (MW=475), 1.10 g (3.0 mmol) 2-(N-2-hexyloxyphophorylethyl-N,N-dimethylammonium)ethyl methacrylate, 0.43 g (3.0 mmol) γ-epoxypropyl methacrylate, 40.0 mg (0.24 mmol) AIBN and 35 mL ethanol, and the relative viscosity of the copolymer was 1.20 (25° C., ethanol, 0.01 g/mL).

FTIR
C=O 1720 $cm^{-1}$, O=P—O 1232 $cm^{-1}$,
P—O—C 1070 $cm^{-1}$, $N^+(CH_3)_2$ 961 $cm^{-1}$,
C—O 1110 $cm^{-1}$, C—O 905 $cm^{-1}$

Elemental Analysis

Phosphorus content: the theoretical value is 1.60%; the measured value was 1.7%;

Nitrogen content: the theoretical value is 0.73%; the measured value was 0.8%.

Example 3

Synthesis of poly[polyethyleneglycolmethylether methacrylate —CO— 2- methacryloyloxyethyl phosphorylcholine —CO-propargyl methacrylate] (1:7:2)

The polymerization solution was prepared by mixing 1.10 g (1.0 mmol) polyethyleneglycolmethylether methacrylate (MW=1100), 2.07 g. (7.0 mml) 2-methacryloyloxyethyl phosphorylcholine, 0.25 g (2.0 mmol) propargyl methacrylate, 25.0 mg (0.15 mmol) AIBN, and 25 ml ethanol. The solution and three anchor glass plates (6×6 $mm^2$) were added into a 50 mL polymerization bottle, The solution was stirred and cooled to −20° C., and alternately vacuumed and filled with pure nitrogen five times, and then polymerized at 65° C. for 30 h under pure nitrogen atmosphere. The anchor glass plates were taken out and the product was separated by precipitating the copolymerization solution in anhydrous diethyl ether. The product was filtered and washed with mix solvent of diethyl ether and ethanol (10:1) for 3 times and dried to constant weight by vacuum at room temperature, consequently, 2.5 g copolymer was obtained, the yield was 73% and the relative viscosity was 1.25 (25° C., ethanol, 0.01 g/mL).

FTIR
C=O 1721 $cm^{-1}$, O=P—O⁻ 1240 $cm^{-1}$, P—O—C 1080 $cm^{-1}$
$N^+(CH_3)_3$ 966 $cm^{-1}$, C—O 1108 $cm^{-1}$, C≡C 2132 $cm^{-1}$

Elemental Analysis

Phosphorus content: the theoretical value is 6.35%; the measured value was 6.5%;

Nitrogen content: the theoretical value is 2.87%; the measured value was 3.0%.

Measured the platelet adhesiveness with SEM after the anchor glass plates were cleaned with deionized water. Compared to the blank contrast test, the platelet adhesiveness on the anchor glass plate was reduced by 100%.

Example 4

Synthesis of poly [polyethyleneglycolmonomethylether methacrylate —CO-2-methacryloyloxyethyl phosphorylcholine —CO-2- isocyanatoethyl methacrylate] (9:2.7:0.3)

The preparing method was same with that in example 1.

3.5 g copolymer (yield 68%) was obtained by the polymerization process with 4.28 g (9.0 mmol) polyethyleneglycolmethylether methacrylate (MW=475), 0.80 g (2.7 mmol) 2-methacryloyloxyethyl phosphorylcholine, 47 mg (0.30 mmol) 2-isocyanatoethyl methacrylate, 36.0 mg (0.22 mmol) AIBN and 28 mL anhydrous dimethyl sulfoxide at 60° C. for 35 h, and the relative viscosity of the copolymer was 1.22 (25° C., anhydrous dimethyl sulfoxide solvent, 0.01 g/mL).

FTIR
C=O 1720 $cm^{-1}$, O=P—O⁻ 1238 $cm^{-1}$, P—O—C 1079 $cm^{-1}$
$N^+(CH_3)_3$ 965 $cm^{-1}$, C—O 1109 $cm^{-1}$, N=C=O 2261 $cm^{-1}$

Elemental Analysis

Phosphorus content: the theoretical value is 1.64%; the measured value was 1.5%;

Nitrogen content: the theoretical value is 0.82%; the measured value was 9.7%.

Example 5

Synthesis of poly[polyethyleneglycolmethylether methacrylate —CO— 2-methacryloyloxyethyl phosphorylcholine —CO— 2,3-epoxypropyl methacrylate] (7:3:2)

The preparing method and polymerization condition were same with that in Example 1.

3.3 g copolymer (yield 73%) were obtained by the polymerization process with 3.33 g (7.0 mmol) polyethyleneglycolmethylether methacrylate (MW=475), 0.89 g (3.0 mmol)

2-methacryloyloxyethyl phosphorylcholine, 0.28 g (2.0 mmol) 2,3-epoxypropyl methacrylate, 32.0 mg (0.20 mmol) AIBN and 28 mL absolute ethyl alcohol, and the relative viscosity of the copolymer was 1.30 (25° C., ethyl alcohol solvent, 0.01 g/mL).

FTIR

C═O 1720 cm$^{-1}$, O═P—O$^-$ 1241 cm$^{-1}$, P—O—C 1081 cm$^{-1}$

N$^+$(CH$_3$)$_3$ 965 cm$^{-1}$, C—O 1109 cm$^{-1}$, C—O 905 cm$^{-1}$

Elemental Analysis

Phosphorus content: the theoretical value is 2.08%; the measured value was 2.2%;

Nitrogen content: the theoretical value is 0.94%; the measured value was 1.0%.

Example 6

Synthesis of poly [polyethyleneglycolmethylether methacrylate —CO— 2-methacryloyloxyethyl phosphorylcholine-CO-hydroxyethyl methylacrylate] (7:3:2)

The preparing method was same with that in Example 3.

5.8 g copolymer (yield 66%) was obtained with 7.70 g (7.0 mmol) polyethyleneglycolmethylether methacrylate (MW=1100), 0.89 g (3.0 mmol) 2-methacryloyloxyethyl phosphorylcholine, 0.26 g (2.0 mmol) hydroxyethyl methylacrylate, 60 mg (0.37 mmol) AIBN and 35 mL absolute ethyl alcohol, and the relative viscosity of the copolymer was 1.25 (25° C., ethyl alcohol solvent, 0.01 g/mL).

FTIR

C═O 1720 cm$^{-1}$, O═P—O$^-$ 1239 cm$^{-1}$, P—O—C 1078 cm$^{-1}$

N$^+$(CH$_3$)$_3$ 965 cm$^{-1}$, C—O 1108 cm$^{-1}$, C—OH 1180 cm$^{-1}$

Elemental Analysis

Phosphorus content: the theoretical value is 1.06%; the measured value was 1.2%;

Nitrogen content: the theoretical value is 0.48%; the measured value was 0.5%.

Compared to the blank contrast test, the platelet adhesiveness on the anchor glass plate was reduced by 95%.

Example 7

Synthesis of poly [polyethyleneglycolmethylether methacrylate —CO— 2-methacryloyloxyethyl phosphorylcholine-CO-hydroxypropyl methacrylate] (8:3:1)

The preparing method and polymerization condition were same with that in Example 3.

2.4 g copolymer (yield 70%) was obtained with 2.40 g (8.0 mmol) polyethyleneglycolmethylether methacrylate (MW=300), 0.89 g (3.0 mmol) 2-methacryloyloxyethyl phosphorylcholine, 0.14 g (1.0 mmol) hydroxypropyl methacrylate, 25.0 mg (0.15 mmol) AIBN and 25 mL absolute ethyl alcohol, and the relative viscosity of the copolymer was 1.20 (25° C., ethyl alcohol solvent, 0.01 g/mL).

FTIR

C═O 1722 cm$^{-1}$, O═P—O$^-$ 1239 cm$^{-1}$, P—O—C 1079 cm$^{-1}$

N$^+$(CH$_3$)$_3$ 966 cm$^{-1}$, C—O 1110 cm$^{-1}$, C—OH 1179 cm$^{-1}$

Elemental Analysis

Phosphorus content: the theoretical value is 2.72%; the measured value was 2.8%;

Nitrogen content: the theoretical value is 1.23%; the measured value was 1.3%.

Compared to the blank contrast test, the platelet adhesiveness on the anchor glass plate was reduced by 95%.

Example 8

Synthesis of poly [polyethyleneglycolmethylether methacrylate —CO— 2-methacryloyloxyethyl phosphorylcholine —CO-3-trimethoxysilylpropyl methacrylate] (9:2.5:0.5)

The preparing method was same with that in example 1.

3.8 g copolymer (yield 74%) was obtained with 4.30 g (9.0 mmol) polyethyleneglycolmethylether methacrylate (MW=475), 0.74 g (2.5 mmol) 2-methacryloyloxyethyl phosphorylcholine, 0.12 g (0.5 mmol) 3-trimethoxysilyl propyl methacrylate, 35.0 mg (0.21 mmol) AIBN and 30 mL absolute ethyl alcohol at 60° C. for 35 h, and the relative viscosity of the copolymer was 1.30 (25° C., absolute methyl alcohol solvent, 0.01 g/mL).

FTIR

C═O 1721 cm$^{-1}$, O═P—O$^-$ 1239 cm$^{-1}$, P—O—C 1079 cm$^{-1}$

N$^+$(CH$_3$)$_3$ 965 cm$^{-1}$, C—O 1109 cm$^{-1}$, Si—O 1090 cm$^{-1}$

Elemental Analysis

Phosphorus content: the theoretical value is 1.51%; the measured value was 1.6%;

Nitrogen content: the theoretical value is 0.68%; the measured value was 0.7%;

Silicon content: the theoretical value is 0.26%; the measured value was 0.3%.

Example 9

Synthesis of poly [polyethyleneglycolmethylether methacrylate —CO— 2-methacryloyloxyethyl phosphorylcholine —CO— 3-trimethoxysilylpropyl methacrylate] (1:10:1)

The preparing method was same with that in example 1.

6.3 g copolymer (yield 76%) was obtained with 5.12 g (1.0 mmol) polyethylene glycolmethylether methacrylate (MW=5120), 2.95 g (10.0 mmol) 2-methacryloyloxyethyl phosphorylcholine, 0.25 g (1.0 mmol) 3-trimethoxysilyl propyl methacrylate, 45.0 mg (0.27 mmol) AIBN and 40 mL absolute ethyl alcohol at 60° C. for 40 h, and the relative viscosity of the copolymer was 1.35 (25° C., absolute ethyl alcohol solvent, 0.01 g/mL).

FTIR

C═O 1721 cm$^{-1}$, O═P—O$^-$ 1239 cm$^{-1}$, P—O—C 1079 cm$^{-1}$

N$^+$(CH$_3$)$_3$ 965 cm$^{-1}$, C—O 1109 cm$^{-1}$, Si—O 1089 cm$^{-1}$

Elemental Analysis

Phosphorus content: the theoretical value is 3.72%; the measured value was 3.4%;

Nitrogen content: the theoretical value is 1.68%; the measured value was 1.4%;

Silicon content: the theoretical value is 0.34%; the measured value was 0.2%.

Example 10

Synthesis of poly [polyethyleneglycolmethylether methacrylate —CO— 2-methacryloyloxyethyl phosphorylcholine —CO-3-(tris(trimethylsiloxy)silyl)propyl methacrylate —CO— 3-trimethoxysilylpropyl methacrylate] (1:3:4:0.5)

The preparing method was same with that in example 1.

2.6 g copolymer (yield 70%) was obtained with 2.08 g (1.0 mmol) polyethylene glycolmethylether methacrylate (MW=2080), 0.89 g (3.0 mmol) 2-methacryloyloxyethyl phosphorylcholine, 1.69 g (4.0 mmol) 3-(tris(trimethylsiloxy)silyl)propyl methacrylate, 124 mg (0.5 mmol) 3-trimethoxysilyl propyl methacrylate, 30 mg (0.18 mmol) AIBN and 20 mL absolute ethyl alcohol-tetrahydrofuran mixed solvent (volume ratio was 4:6) at 60° C. for 24 h and then at 70° C. for 16 h, and the relative viscosity of the copolymer is 1.30 (25° C., absolute ethyl alcohol-tetrahydrofuran mixed solvent (volume ratio was 1:1), 0.01 g/mL).

FTIR $C=O$ 1721 $cm^{-1}$, $O=P—O^-$ 1240 $cm^{-1}$, $P—O—C$ 1080 $cm^{-1}$ $N^+(CH_3)_3$ 960 $cm^{-1}$, $C—O$ 1110 $cm^{-1}$, $Si—O—Si$ 1060 $cm^{-1}$

Elemental Analysis

Phosphorus content: the theoretical value is 2.50%; the measured value was 2.3%;

Nitrogen content: the theoretical value is 1.13%; the measured value was 1.0%;

Silicon content: the theoretical value is 12.37%; the measured value was 12.9%.

Example 11

Synthesis of poly [2-methoxyethyl acrylate-CO-2-methacryloyloxyethyl phosphorylcholine-CO-3-trimethoxysilyl propyl methacrylate] (7:3:0.2)

The preparing method was same with that in example 1.

5.6 g copolymer (yield 61%) was obtained with 4.56 g (35.0 mmol) 2-methoxyethyl acrylate, 4.43 g (15.0 mmol) 2-methacryloyloxyethyl phosphorylcholine, 0.25 g (1.0 mmol) 3-trimethoxysilyl propyl methacrylate, 50.0 mg (0.27 mmol) AIBN and 40 mL absolute ethyl alcohol at 60° C. for 35 h, and the relative viscosity of the copolymer was 1.20 (25° C., absolute ethyl alcohol solvent, 0.01 g/mL).

FTIR $C=O$ 1720 $cm^{-1}$, $O=P—O^-$ 1239 $cm^{-1}$, $P—O—C$ 1077 $cm^{-1}$ $N^+(CH_3)_3$ 966 $cm^{-1}$, $C—O$ 1110 $cm^{-1}$, $Si—O$ 1091 $cm^{-1}$

Elemental Analysis

Phosphorus content: the theoretical value is 5.03%; the measured value was 4.5%;

Nitrogen content: the theoretical value is 2.27%; the measured value was 2.0%;

Silicon content: the theoretical value is 0.31%; the measured value was 0.2%.

Example 12

Blending of polyethyleneglycolmethylether methacrylate —CO— 2-methacryloyloxyethyl phosphorylcholine —CO— 2,3-epoxypropyl methacrylate and epoxy resin 0.50 g copolymer of example 4 was dissolved in 10 mL tetrahydrofuran, 1.20 g epoxy resin 6101 (Wuxi resin plant) and 1.5% ethidene diamine were dissolved in another 15 mL tetrahydrofuran, then the copolymer solution was added into epoxy resin solution by drops under stirring, after that, handled the mixed solution under ultrasonic for 5 mins and poured the mixed solution into the PTFE mould along the mould wall. The mould was covered with a filter paper and placed in the chemical hood for about 48 h, and then a transparent film was obtained after 2 h healing under 80° C. Compare to the controlled film, the platelet adhesiveness was reduced by 78%.

Example 13

Blending of polyethyleneglycolmethylether methacrylate-CO-2-methacryloyloxyethyl phosphorylcholine —CO— 3-trimethoxysilylpropyl methacrylate copolymer and with poly (ether-urethane)

0.35 g copolymer of example 7 was dissolved in 10 mL tetrahydrofuran, and 0.65 g poly (ether-urethane) (WHT-8175, Yantai Wanhua New Material Co., Ltd) was dissolved in another 15 mL tetrahydrofuran, then copolymer solution was added into poly (ether-urethane) solution by drops under stirring, after that, handled the mixed solution under ultrasonic for 5 mins and poured the mixed solution into the PTFE mould along the mould wall. The mould was covered with a filter paper and placed in the chemical hood for 48 h, and then a transparent film was obtained after 2 h heating at 80° C. Compare to the controlled PEU film, the water contact angle is 5°, and the platelet adhesiveness was reduced by 85%.

Example 14

Blending of polyethyleneglycolmethylether methacrylate —CO— 2- methacryloyloxyethyl phosphorylcholine —CO— 3-trimethoxysilylpropyl methacrylate copolymer and with room-temperature-vulcanized silicone rubber 0.50 g copolymer of example 7 was dissolved in 10 mL tetrahydrofuran, 1.0 g rubber 107 and 3% vulcanizing agent were dissolved in another 15 mL tetrahydrofuran, then the copolymer solution was added into rubber 107 solution by drops under stirring, after that, handled the mixed solution under ultrasonic for 5 mins and poured the mixed solution into the PTFE mould along the mould wall. After vacuum deaeration, The mould was covered by filter paper and placed in the chemical hood for 7 days, and then an almost transparent film was obtained after 2 h heating at 80° C. Compared to the controlled film, the water contact angle is 8°, and the platelet adhesiveness was reduced by 75%.

Example 15

Synthesis of poly [polyethyleneglycolmethylether methacrylate —CO— 2- methacryloyloxyethyl phosphorylcholine —CO-methylacrylic acid] (7:3:2)

The preparation steps and polymerization conditions were the same with example 1.

2.4 g copolymer (yield 55%) was obtained with 3.33 g (7.0 mmol) polyethylene glycolmethylether methacrylate (MW=475), 0.89 g (3.0 mmol) 2- methacryloyloxyethyl phosphorylcholine, 0.17 g (2.0 mmol) methylacrylic acid, 33.0 mg (0.20 mmol) AIBN and 30 mL ethanol, and the relative viscosity of the copolymer was 1.15 (25° C., methanol, 0.01 g/mL).

FTIR $C=O$ 1720 $cm^{-1}$, $O=P—O^-$ 1240 $cm^{-1}$, $P—O—C$ 1079 $cm^{-1}$, $N^+(CH_3)_3$ 966 $cm^{-1}$, $C—O$ 1109 $cm^{-1}$.

Elemental Analysis

Phosphorus content: the theoretical value is 2.13%; the measured value was 2.2%;

Nitrogen content: the theoretical value is 0.96%; the measured value was 1.0%.

Example 16

Synthesis of poly [polyethyleneglycolmethylether methacrylate —CO— 2- methacryloyloxyethyl phosphorylcholine —CO— 2-methacryloyloxyethyltrimethyl ammonium chloride] (8:3:1)

The preparation steps and polymerization conditions were the same with example 1.

2.5 g copolymer (yield 71%) was obtained with 2.40 g (8.0 mmol) polyethyleneglycolmethylether methacrylate (MW=300), 0.89 g (3.0 mmol) 2- methacryloyloxyethyl phosphorylcholine, 0.21 g (1.0 mmol) N-2- methacryloyloxyethyl-N,N,N-trimethyl ammonium chloride, 25.0 mg (0.15 mmol) AIBN and 25 mL ethanol, and the relative viscosity of the copolymer was 1.20 (25° C., methanol, 0.01 g/mL).

FTIR

C—O 1720 $cm^{-1}$, O=P—$O^-$ 1240 $cm^{-1}$, P—O—C 1079 $cm^{-1}$, $N^+(CH_3)_3$ 966 $cm^{-1}$, C—O 1110 $cm^{-1}$

Elemental Analysis

Phosphorus content: the theoretical value is 2.67%; the measured value was 2.8%;

Nitrogen content: the theoretical value is 1.61%; the measured value was 1.7%;

Chlorine content: the theoretical value is 1.02%; the measured value was 0.9%.

Example 17

Synthesis of poly [polyethyleneglycolmethylether methacrylate —CO— 2- methacryloyloxyethyl phosphorylcholine —CO— methacrylic acid —CO— stearyl methacrylate] (8:3:2:2)

The preparation steps were the same with example 1.

2.8 g copolymer (yield 68%) was obtained with 2.40 g (8.0 mmol) polyethyleneglycolmethylether methacrylate (MW=300), 0.89 g (3.0 mmol) 2- methacryloyloxyethyl phosphorylcholine, 0.17 g (2.0 mmol) methylacrylic acid, 0.68 g (2.0 mmol) stearyl methacrylate, 30.0 mg (0.18 mmol) AIBN and 28 mL ethanol at 65° C. for 35 h, and the relative viscosity is 1.20 (25° C., ethanol, 0.01 g/mL).

FTIR

C—O 1722 $cm^{-1}$, O=P—$O^-$ 1239 $cm^{-1}$, P—O—C 1079 $cm^{-1}$, $N^+(CH_3)_3$ 966 $cm^{-1}$, C—O 1111 $cm^{-1}$

Elemental Analysis

Phosphorus content: the theoretical value is 2.26%; the measured value was 2.4%;

Nitrogen content: the theoretical value is 1.02%; the measured value was 1.1%.

Example 18

Synthesis of poly [polyethyleneglycolmethylether methacrylate —CO— 2- methacryloyloxyethyl phosphorylcholine —CO— 2-methacryloyloxyethyltrimethyl ammonium chloride —CO— stearyl methacrylate] (8:3:2:2)

The preparation steps were the same with example 1.

3.8 g copolymer (yield 66%) were obtained with 3.80 g (8.0 mmol) polyethyleneglycolmethylether methacrylate (MW=475), 0.89 g (3.0 mmol) 2- methacryloyloxyethyl phosphorylcholine, 0.42 g (2.0 mmol) 2- methacryloyloxyethyl trimethyl ammonium chloride, 0.68 g (2.0 mmol) stearyl methacrylate, 40.0 mg (0.24 mmol) AIBN and 35 mL ethanol at 65° C. for 35 h, and the relative viscosity was 1.25 (25° C., ethanol, 0.01 g/mL).

FTIR

C—O 1725 $cm^{-1}$, O=P—$O^-$ 1240 $cm^{-1}$, P—O—C 1079 $cm^{-1}$, $N^+(CH_3)_3$ 965 $cm^{-1}$, C—O 1110 $cm^{-1}$

Elemental Analysis

Phosphorus content: the theoretical value is 1.61%; the measured value was 1.7%;

Nitrogen content: the theoretical value is 1.22%; the measured value was 1.3%;

Chlorine content: the theoretical value is 1.24%; the measured value was 1.1%.

Example 19

Synthesis of poly [polyethyleneglycolmethylether methacrylate —CO— N,N-dimethyl-N-2-methacryloyloxyethyl-N-(2-carboxyethyl)ammonium —CO— hydroxypropyl methacrylate] (7:3:2)

The preparation steps were the same with example 3.

3.1 g copolymer (yield 72%) was obtained with 3.33 g (7.0 mmol) polyethylene glycolmethylether methacrylate (MW=475), 0.69 g (3.0 mmol) N,N— dimethyl-N-2- methacryloyloxyethyl —N-(2-carboxyethyl) ammonium, 0.29 g (2.0 mmol) hydroxypropyl methacrylate, 32.0 mg (0.20 mmol) AIBN and 35 mL ethanol at 65° C. for 30 h, and the relative viscosity was 1.20 (25° C., methanol, 0.01 g/mL).

FTIR

C—O 1725 $cm^{-1}$, $CO_2^-$ 1384 $cm^{-1}$, 1593 $cm^{-1}$ $N^+(CH_3)_2$ 960 $cm^{-1}$, C—O 1109 $cm^{-1}$, C—OH 1180 $cm^{-1}$

Elemental Analysis

Nitrogen content: the theoretical value is 0.98%; the measured value was 1.1%.

Platelet adhesion of anchor plate was reduced by 90%.

Example 20

Synthesis of poly [polyethyleneglycolmethylether methacrylate —CO— N,N— dimethyl-N-2-methacryloyloxyethyl-N-(2-carboxyethyl)ammonium —CO— 2,3-epoxy propyl methacrylate] (7:3:2)

The preparation steps were the same with example 1.

2.9 g copolymer (yield 67%) was obtained with 3.33 g (7.0 mmol) polyethyleneglycolmethylether methacrylate (MW=475), 0.69 g (3.0 mmol) N,N— dimethyl-N-2- methacryloyloxyethyl —N-(2-carboxyethyl) ammonium, 0.28 g (2.0 mmol) 2,3-epoxypropyl methacrylate, 33.0 mg (0.20 mmol) AIBN and 30 mL ethanol at 60° C. for 30 h, and the relative viscosity was 1.15 (25° C., methanol, 0.01 g/mL).

FTIR

C—O 1722 $cm^{-1}$, $CO_2^-$ 1382 $cm^{-1}$, 1590 $cm^{-1}$ $N^+(CH_3)_2$ 959 $cm^{-1}$, C—O 1110 $cm^{-1}$, C—O 906 $cm^{-1}$

Elemental Analysis

Nitrogen content: the theoretical value is 0.98%; the measured value was 1.1%.

Example 21

Synthesis of poly [polyethyleneglycolmethylether methacrylate —CO— N,N-dimethyl-N-2-methacryloyloxyethyl-N-(2-carboxyethyl)ammonium —CO -3-trimethoxysilylpropyl methacrylate] (8:3:1)

The preparation steps were the same with example 1.

3.3 g copolymer (yield 70%) was obtained with 3.80 g (8.0 mmol) polyethyleneglycolmethylether methacrylate (MW=475), 0.69 g (3.0 mmol) N,N— dimethyl-N-2- methacryloyloxyethyl —N-(2-carboxyethyl) ammonium, 0.25 g (1.0 mmol) 3-trimethoxysilylpropyl methacrylate, 35.0 mg (0.21 mmol) AIBN and 35 mL ethanol at 60° C. for 30 h, and the relative viscosity was 1.30 (25° C., ethanol, 0.01 g/mL).

FTIR

C—O 1724 cm$^{-1}$, CO$_2^-$ 1382 cm$^{-1}$, 1590 cm$^{-1}$

N$^+$(CH$_3$)$_2$ 960 cm$^{-1}$, C—O 1109 cm$^{-1}$, Si—O 1084 cm$^{-1}$

Elemental Analysis

Nitrogen content: the theoretical value is 0.89%; the measured value was 1.0%;

Silicon content: the theoretical value is 0.60%; the measured value was 0.7%.

What is claimed is:

1. A bondable blood-friendly polymer polymerized by at least three kinds of monomers; the three kinds of monomers are:
   a first monomer (I), which is a polyethylene glycol alkyl ether acrylate or a polyethylene glycol alkyl ether methacrylate;
   a second monomer (II), which is a zwitterionic acrylic ester or a zwitterionic methacrylic ester; and
   a third monomer (III), which has a chemical structure selected from

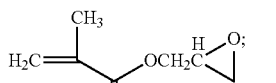

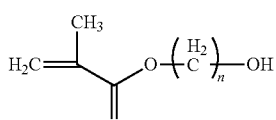

wherein n=2, 3, or 4;

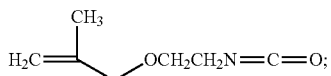

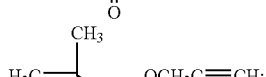

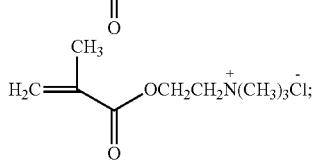

wherein a mole ratio of the first monomer (I), the second monomer (II) and the third monomer (III) is 1-9:1-7:0.2-3.

2. The bondable blood-friendly polymer of claim 1, wherein the first monomer (I) has a chemical structure below:

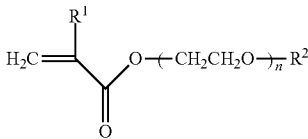

wherein R$^1$ is H, or CH$_3$;
R$^2$ is CH$_3$; and
n is 2-114.

3. The bondable blood-friendly polymer of claim 1, wherein the second monomer (II) has a chemical structure selected from

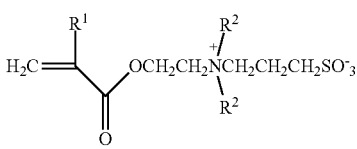

wherein R$^1$ is H or CH$_3$, and R$^2$ is CH$_3$ or C$_2$H$_5$;

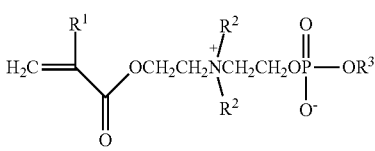

wherein R$^1$ is H or CH$_3$, R$^2$ is CH$_3$ or C$_2$H$_5$, and R$^3$ is C$_6$-C$_{12}$;

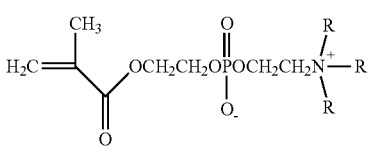

wherein R is CH$_3$ or C$_2$H$_5$; and

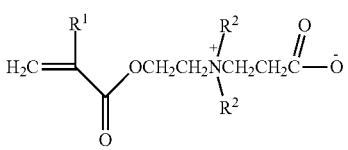

wherein R$^1$ is H or CH$_3$, and R$^2$ is CH$_3$ or C$_2$H$_5$.

4. The bondable blood-friendly polymer of claim 1, wherein the polymer is polymerized by four kinds of monomers, the four kinds of monomers are the first monomer (I), the second monomer (II), the third monomer (III) and a fourth monomer (IV) which is a higher alkyl methacrylate or a 3-[tris (trimethylsiloxy) silyl]propyl methacrylate.

5. The bondable blood-friendly polymer of claim 4, wherein a mole ratio of the first monomer (I), the second monomer (II), the third monomer (III) and the fourth monomer (IV) is 1-8:1-7:0.2-3:2-4.

6. A coating layer on a manufacture, wherein a material of the coating layer comprises a polymer polymerized by monomers comprising:

a first monomer (I), which is a polyethylene glycol alkyl ether acrylate or a polyethylene glycol alkyl ether methacrylate;

a second monomer (II), which is a zwitterionic acrylic ester or a zwitterionic methacrylic ester; and a third monomer (III), which has a chemical structure selected from

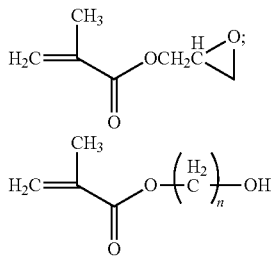

wherein n=2, 3, or 4;

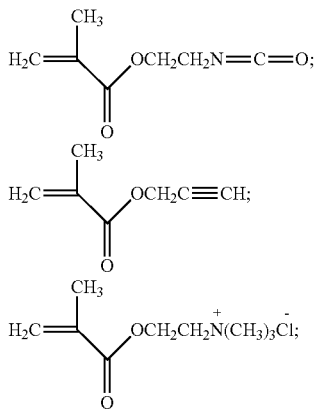

wherein a mole ratio of the first monomer (I), the second monomer (II) and the third monomer (III) is 1-9:1-7:0.2-3.

7. The coating layer of claim 6, wherein the first monomer (I) has a chemical structure below:

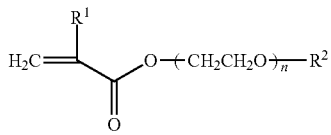

wherein $R^1$ is H, or $CH_3$;
$R^2$ is $CH_3$; and
n is 2-114.

8. The coating layer of claim 6, wherein the second monomer (II) has a chemical structure selected from

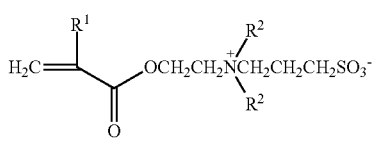

wherein $R^1$ is H or $CH_3$, and $R^2$ is $CH_3$ or $C_2H_5$;

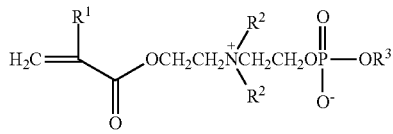

wherein $R^1$ is H or $CH_3$, $R^2$ is $CH_3$ or $C_2H_5$, and $R^3$ is $C_6$-$C_{12}$;

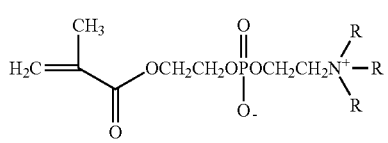

wherein R is $CH_3$ or $C_2H_5$; and

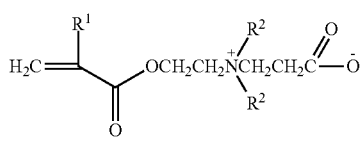

wherein $R^1$ is H or $CH_3$, and $R^2$ is $CH_3$ or $C_2H_5$.

9. The coating layer of claim 6, wherein the monomers further comprises a fourth monomer (IV), which is a higher alkyl methacrylate or a 3-[tris (trimethylsiloxy) silyl]propyl methacrylate.

10. The coating layer of claim 9, wherein a mole ratio of the first monomer (I), the second monomer (II), the third monomer (III) and the fourth monomer (IV) is 1-8:1-7:0.2-3:2-4.

11. The coating layer of claim 6, wherein the coating layer is coated on a manufacture made from a material of a glass, a ceramics, or a metal.

12. A method of preparing bondable blood-friendly polymer, the method comprising:

adding a first monomer (I), a second monomer (II), a third monomer (III), and a radical initiator into a solvent, wherein the first monomer (I) is a polyethylene glycol alkyl ether acrylate or a polyethylene glycol alkyl ether methacrylate, the second monomer (II) is a zwitterionic acrylic ester or a zwitterionic methacrylic ester, the third monomer (III) has a chemical structure selected from

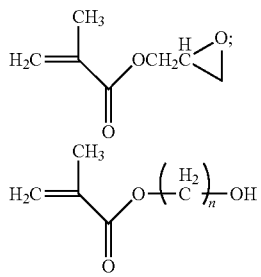

wherein n=2, 3, or 4;

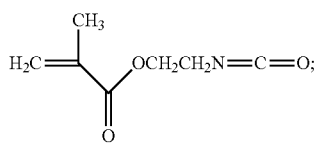

-continued

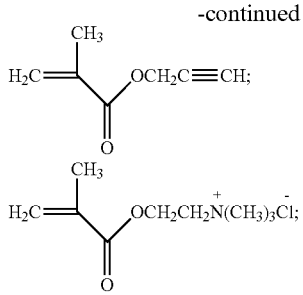

the solvent is an alcohol, a mixed solvent of alcohol and tetrahydrofuran, or dimethyl sulfoxide; and the radical initiator is azobisisobutyronitrile (AIBN), azobiscyanovaleric acid (ACVA), or benzoyl peroxide (BPO);
polymerizing the first monomer (I), the second monomer (II), and the third monomer (III) under nitrogen atmosphere at 60-70° C. for 24-45 h to obtain a polymer; and precipitating the polymer in an anhydrous ether.

13. The method of claim 12, wherein a mole ratio of the first monomer (I), the second monomer (II) and the third monomer (III) is 1-9:1-7:0.2-3.

14. The method of claim 12, further comprising adding a fourth monomer (IV) into the solvent to be polymerized with the first monomer (I), the second monomer (II), and the third monomer (III), wherein the fourth monomer (IV) is a higher alkyl methacrylate or a 3-[tris (trimethylsiloxy) silyl]propyl methacrylate.

15. The method of claim 14, wherein a mole ratio of the first monomer (I), the second monomer (II), the third monomer (III) and the fourth monomer (IV) is 1-8:1-7:0.2-3:2-4.

16. The method of claim 12, wherein the first monomer (I) has a chemical structure below:

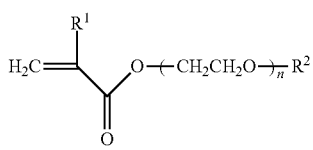

wherein $R^1$ is H, or $CH_3$;
$R^2$ is $CH_3$; and
n is 2-114.

17. The method of claim 12, wherein the second monomer (II) has a chemical structure selected from

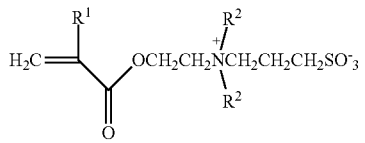

wherein $R^1$ is H or $CH_3$, and $R^2$ is $CH_3$ or $C_2H_5$;

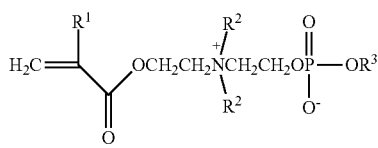

wherein $R^1$ is H or $CH_3$, $R^2$ is $CH_3$ or $C_2H_5$, and $R^3$ is $C_6$-$C_{12}$;

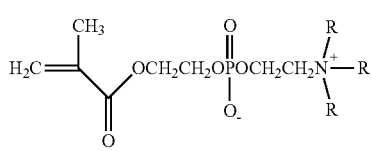

wherein R is $CH_3$ or $C_2H_5$; and

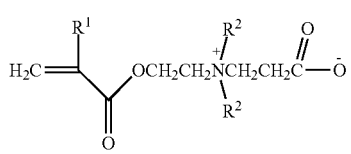

wherein $R^1$ is H or $CH_3$, and $R^2$ is $CH_3$ or $C_2H_5$.

* * * * *